United States Patent
Wang et al.

(10) Patent No.: US 9,326,312 B2
(45) Date of Patent: *Apr. 26, 2016

(54) MOBILE TERMINATED CALL IMPROVEMENTS

(71) Applicant: Telefonaktiebolaget L M Ericsson (publ), Stockholm (SE)

(72) Inventors: Chunbo Wang, Shanghai (CN); Yong Yang, Molndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/585,325

(22) Filed: Dec. 30, 2014

(65) Prior Publication Data

US 2015/0109898 A1    Apr. 23, 2015

Related U.S. Application Data

(63) Continuation of application No. 13/458,519, filed on Apr. 27, 2012, now Pat. No. 8,929,335.

(60) Provisional application No. 61/480,453, filed on Apr. 29, 2011.

(51) Int. Cl.
*H04W 4/00* (2009.01)
*H04W 76/02* (2009.01)
(Continued)

(52) U.S. Cl.
CPC ............ *H04W 76/028* (2013.01); *H04W 24/04* (2013.01); *H04W 76/045* (2013.01); *H04W 88/16* (2013.01)

(58) Field of Classification Search
CPC .................................................... H04W 24/04
USPC .......................................................... 370/331
See application file for complete search history.

(56) References Cited

U.S. PATENT DOCUMENTS 8,477,725 B2 *   7/2013   Shuai et al. ................... 370/331
8,929,335 B2 *   1/2015   Wang et al. ................... 370/331

(Continued)

FOREIGN PATENT DOCUMENTS

WO   2009150499 A1   12/2009

OTHER PUBLICATIONS

Huawei, "Pseudo-CR on Solution for SGW/PGW Failure", 3GPP Draft, C4-110156, 3rd Generation Partnership Project (3GPP), Mobile Competence Centre, 650 Route Des Lucioles, F-06921 Sophia-Antipolis Cedex, France, vol. CT WG4, No. Ljubljana, Slovenia, Jan. 24, 2011, Jan. 21, 2011, XP050484029, 6 pages.

Huawei et al., "Triggering of Non-Attached MTC Device", 3GPP Draft, TD S2-110924, 3rd Generation Partnership Project (3GPP) Mobile Competence Centre, 650 Route Des Lucioles, F-06921 Sophia-Antipolis Cedex, France, vol. SA WG2, No. Salt Lake City; Feb. 24, 2011 XP050524010, 2 pages.

(Continued)

*Primary Examiner* — Wei Zhao
(74) *Attorney, Agent, or Firm* — Rothwell, Figg, Ernst & Manbeck, P.C.

(57) ABSTRACT

In one aspect, a method for a packet gateway node (PGW) is disclosed. The PGW being adapted for (a) communicating with at least a serving gateway node, SOW, (b) receiving and forwarding downlink data packets to a user entity, UE, and (c) communicating with a mobility management entity, MME. In one embodiment, the method comprises: the PGW, when receiving a downlink user plane data packet destined for the UE on a Packet Data Network, PDN, connection associated with a restarted SGW, determining if the PDN connection has not yet been relocated to a new SGW, and, if so, selecting at least one SGW from a set of SGWs including the restarted SGW or another SGW and transmitting a control plane signal to at least one of the selected SGWs, the control plane signal identifying at least the UE.

24 Claims, 6 Drawing Sheets

(51) Int. Cl.
*H04W 24/04* (2009.01)
*H04W 76/04* (2009.01)
*H04W 88/16* (2009.01)

(56) References Cited

U.S. PATENT DOCUMENTS

2008/0188223 A1* 8/2008 Vesterinen et al. ............ 455/436
2009/0318147 A1   12/2009 Zhang et al. ................ 455/435.1
2012/0057532 A1*  3/2012 Qi et al. ........................ 370/328

OTHER PUBLICATIONS

Ericsson, "Pseudo-CR on SGW Failure Solution by PGW Initiated Paging Request", 3GPP Draft, C4-111139_SGWFAILURE_SOLUTION2_PA3, 3rd Generation Partnership Project (3GPP), Mobile Competence Centre, 650, Route Des Lucioles, F-06921 Sophia-Antipolis Cedex, France, vol. CT WG4, No. Tallinn, Estonia, Apr. 29, 2011, XP050484932, 2 pages.

International Search Report dated Sep. 10, 2012, from corresponding International application No. PCT/EP2012/057831, 6 pages.

* cited by examiner

FIG. 3 - PGW

FIG. 4 – SGW - MME

MOBILE TERMINATED CALL IMPROVEMENTS

CROSS-REFERENCE TO RELATED APPLICATIONS

This application is a continuation of application Ser. No. 13/458,519, filed on Apr. 27, 2012 (published as US 20120275430), which claims the benefit of U.S. Provisional Patent Application No. 61/480,453, filed on Apr. 29, 2011. The above identified applications and publications are incorporated by reference herein in their entirety.

TECHNICAL FIELD

This invention relates to the field of handling downlink data in telecommunication networks. More particularly, the invention pertains to Evolved Packet Core, EPC, System Architecture Evolution, SAE, systems in which a serving gateway node may be subject to restarting.

BACKGROUND

Some key elements of the SAE/EPC network have been dealt with in the following references: [1] TS 23.236: Intra-domain connection of Radio Access Network (RAN) nodes to multiple Core Network (CN) nodes; [2] TS 23.401: General Packet Radio Service (GPRS) enhancements for Evolved Universal Terrestrial Radio Access Network (E-UTRAN) access; [3] TS 24.301: Non-Access-Stratum (NAS) protocol for Evolved Packet System (EPS); Stage 3; [4] TS 23.007: Restoration Procedure; [5] TS 29.274: 3GPP Evolved Packet System (EPS); Evolved General Packet Radio Service (GPRS) Tunnelling Protocol for Control plane (GTPv2-C); Stage 3; [6] TR 23.857.

Figure 1:
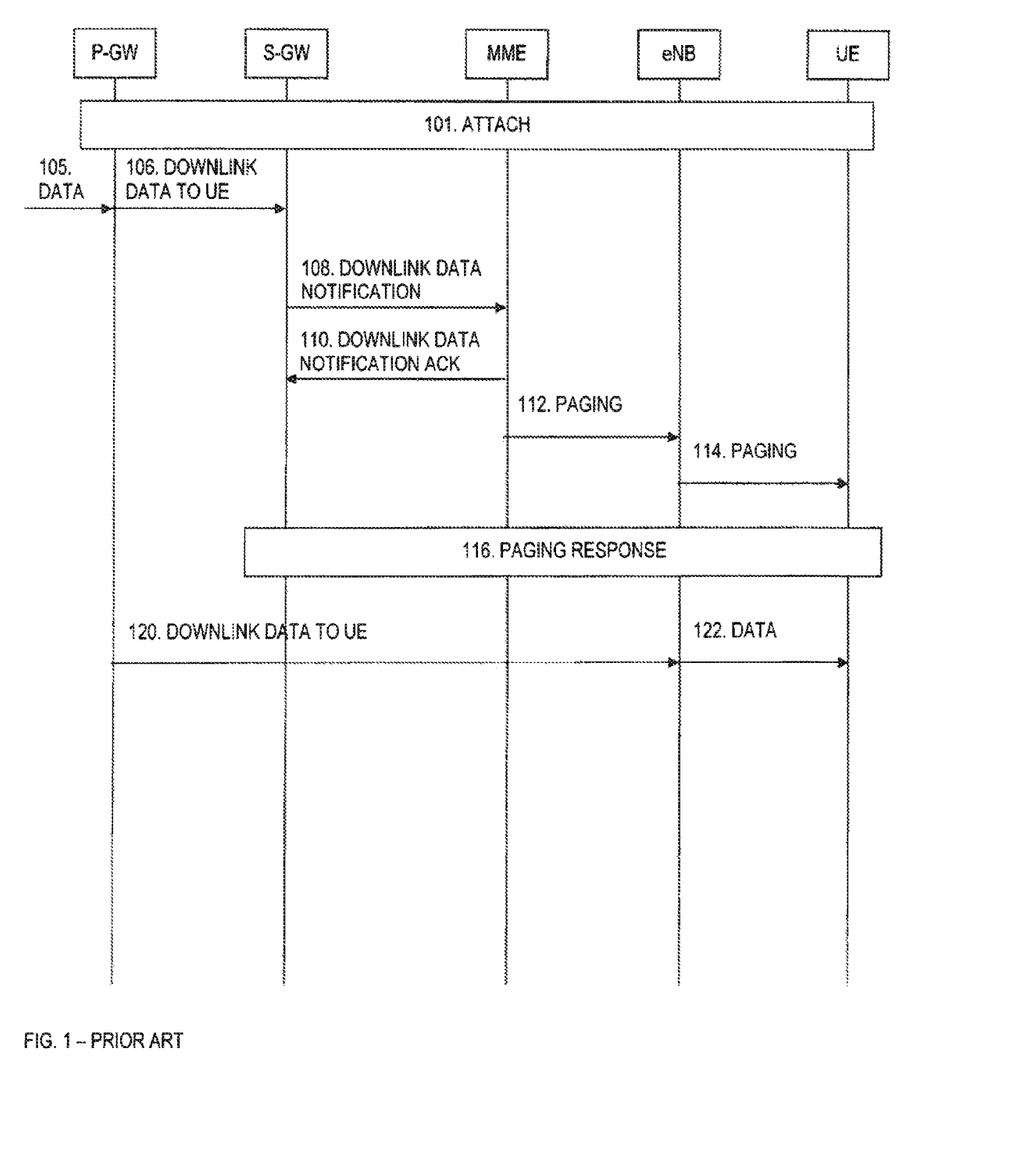
FIG. 1 shows a prior art signalling diagram relating to a mobile terminated data transfer according to EPC/SAE.

With the migration towards all IP (Internet Protocol) networks, all mobile traffic (voice and data) will be carried on the packet core network step by step. In FIG. 1, the procedure in an EPC network for Mobile Terminating (MT) voice service, when the UE is in Idle state is shown according to 3GPP TS 23.401, chapter 5.3.4.3. The mobile terminated traffic can be voice, data or multimedia traffic. In this procedure, the following events may be undertaken: (101) The User Entity, UE, attaches and registers in the SAE/EPC network. (105) The PDN (Packet Data Network) Gateway, P-GW, receives a data packet addressed to the UE (IP address) and forwards the data packet to the Serving Gateway, S-GW, via the corresponding GTP (GPRS Tunnelling Protocol) tunnel of the UE. (108) SGW sends Downlink Data Notification to Mobile Mobility Entity, MME. (110) MME replies to S-GW with Downlink Data Notification Ack (Acknowledge). (112) UE location is known by MME with an accuracy of the serving Tracking Area. MME pages UE in the Tracking Area. (114) When eNode B, eNB, receives paging messages from the MME, the eNB initiates Paging procedure over the air. (116) Upon reception of paging indication, the UE initiates UE triggered Service Request procedure (specified in TS 23.401) as the paging response. (120) The downlink data is sent to the UE.

MT Call Problem in Case S-GW of Restart:

According to the current mechanism described in 3GPP TS 23.007, when a P-GW/MME/SGSN detects that a peer S-GW has restarted, it shall delete all PDN (Packet data Network) connection table data/MM bearer contexts associated with the peer node that fail as well as freeing any internal PGW/MME/SGSN resources associated with those PDN connections. Since there are no bearer/MM (Mobility Management) contexts in the PGW, the mobile terminated service can not be delivered to the UE for a long time.

TR 23.857 proposes the following alternative solution to recover the bearer and MM contexts after detection of a SGW failure:

(1) The MME/S4-SGSN (Serving GPRS Support Node) and PGW maintain the bearers and MM contexts after detection of SGW failure. If the MME/S4-SGSN detects the SGW failure or restarts by referring to restart counter, instead of removing associated resources, the MME/S4-SGSN and PGW maintain the bearers and MM contexts. The MME/S4-SGSN needs to know whether the PGW supports the capability to maintain the old PDN connection after SGW failure or restarts, vice versa: which can be learned based on local configuration or new signalling between MME and PGW. This makes it possible for the MME/S4-SGSN to select a new SGW for the UE.

(2) The MME/S4-SGSN selects a new SGW for the ECM_IDLE (EPS Connection Management—IDLE) UE. The MME/S4-SGSN selects a new SGW for the ECM_IDLE UE based on the last visited TAI/RAI (Tracking Area Identity/Routing Area Identity). Then MME/S4-SGSN sends a Create Session Request message to the new SGW to establish the bearer contexts. The new SGW will send a Modify Bearer Request message to the PGW to update the bearer context in the PGW.

(3) The MME/S4-SGSN releases S1/Iu resources and selects a new SGW for the ECM_CONNECTED UE. The MME/S4-SGSN firstly releases S1/Iu resources of ECM_CONNECTED UE. Then the MME/S4-SGSN will handle the UE in the same way as for the ECM_IDLE UE.

However, considering typical load conditions, the inventors note that the above recovery can not be finished for all the UEs immediately. In case there is an incoming MT (mobile terminated) call arriving at PGW before the recovery occurs, the MT call will fail according to the above described mechanism.

SUMMARY OF THE INVENTION

It is an object of the invention to secure that mobile terminated calls are not lost, in particular in situations when e.g. a failing SGW restarts.

This object has been accomplished by means of respective methods and nodes as well as by means of the signalling according to embodiments of the invention, namely as defined in the following:

A method for a packet gateway node, PGW (P-GW), being adapted for communicating with at least a serving gateway node, SGW (S-GW), the PGW being adapted for receiving and forwarding downlink data packets to a user entity, UE, the SGW moreover being adapted for communicating with a mobility management entity, MME (MME/SGSN). The method comprises the steps of when receiving a downlink user plane data packet (505) destined for the UE on a Packet Data Network, PDN, connection associated with a restarted SGW; determining if the PDN connection has not yet been relocated to a new SGW. If that is the case, selecting at least one SGW, that is, the restarted SGW or another SGW; transmitting a control plane signal to the selected SGW, the control plane signal identifying at least the UE.

There is also provided a method for a serving gateway node, SGW, being adapted for communicating with at least a packet gateway node, PGW, the SGW and being adapted for receiving and forwarding downlink data packets to a user entity, UE, the SGW communicating moreover communicating with a mobility management entity, MME; comprising the steps of the SGW if receiving a control plane signal from the PGW identifying at least the UE, forwarding the control plane signal to a plurality of MME's the SGW is connected to or to a MME indicated in the control plane signal.

Moreover a method for a Mobility Management Entity is provided. The MME being adapted for inserting its MME identity (MME ID) in a Create Session Request signal or in Modify Bearer Request Signal.

Specific signals are provided according to embodiments of the invention. A signal for a 3GPP a serving gateway node, SGW or a PDN gateway node, P-GW, or a Mobility Management Entity, MME, the SGW being adapted for communicating with at least a PDN gateway node, P-GW, and a user entity, UE is provided. This signal is formatted as a Create Session Request for use during attach and RAU/TAU/handover with SGW relocation procedure, or Modify Bearer Request during inter MME/Serving Gateway Support Node mobility procedure. The signal may comprise an information element containing a Mobile Mobility Entity Identity, MME ID / Serving Gateway Support Node identity, MME/SGSN ID.

There is also provided a signal for a 3GPP a serving gateway node, S-GW, or a PDN gateway node, P-GW, or a Mobility Management Entity, MME, the P-GW and S-GW being adapted for communicating with one another, the S-GW being further adapted for communicating with a user entity, UE, via a mobility management entity, MME. The latter signal is being formatted as a GTP message such as Paging request or Downlink Data Notification message with information elements corresponding to an International Mobile Subscriber Identity, IMSI, and/or a Mobile Mobility Entity Identity, MME ID.

Additionally, a Packet gateway node, PGW (P-GW), is provided being adapted for communicating with at least a serving gateway node, SGW (S-GW), the PGW being adapted for receiving and forwarding downlink data packets to a user entity, UE, the SGW moreover being adapted for communicating with a mobility management entity, MME; the PGW being adapted for, when receiving a downlink user plane data packet destined for the UE on a Packet Data Network, PDN, connection associated with a restarted SGW, determining if the PDN connection has not yet been relocated to a new SGW and if so selecting at least one SGW, that is, the restarted SGW or another SGW; transmitting a control plane signal to the selected SGW, the control plane signal identifying at least the UE.

Also a Serving gateway node, SGW, is provided being adapted for communicating with at least a packet gateway node, PGW, the SGW and being adapted for receiving and forwarding downlink data packets to a user entity, UE, the SGW communicating moreover communicating with a mobility management entity, MME; the SGW being adapted for, if receiving a control plane signal from the PGW identifying at least the UE, forwarding the control plane signal to a plurality of MME's the SGW is connected to or to a MME indicated in the control plane signal.

Moreover, a Mobility Management Entity, MME is provided, the MME being adapted for inserting its MME identity (MME ID) in a Create Session Request signal or in Modify Bearer Request Signal.

Further advantages of the invention will appear from the following detailed description.

DETAILED DESCRIPTION

MT Call Enhancements in Case of SGW Restart

Figure 5:
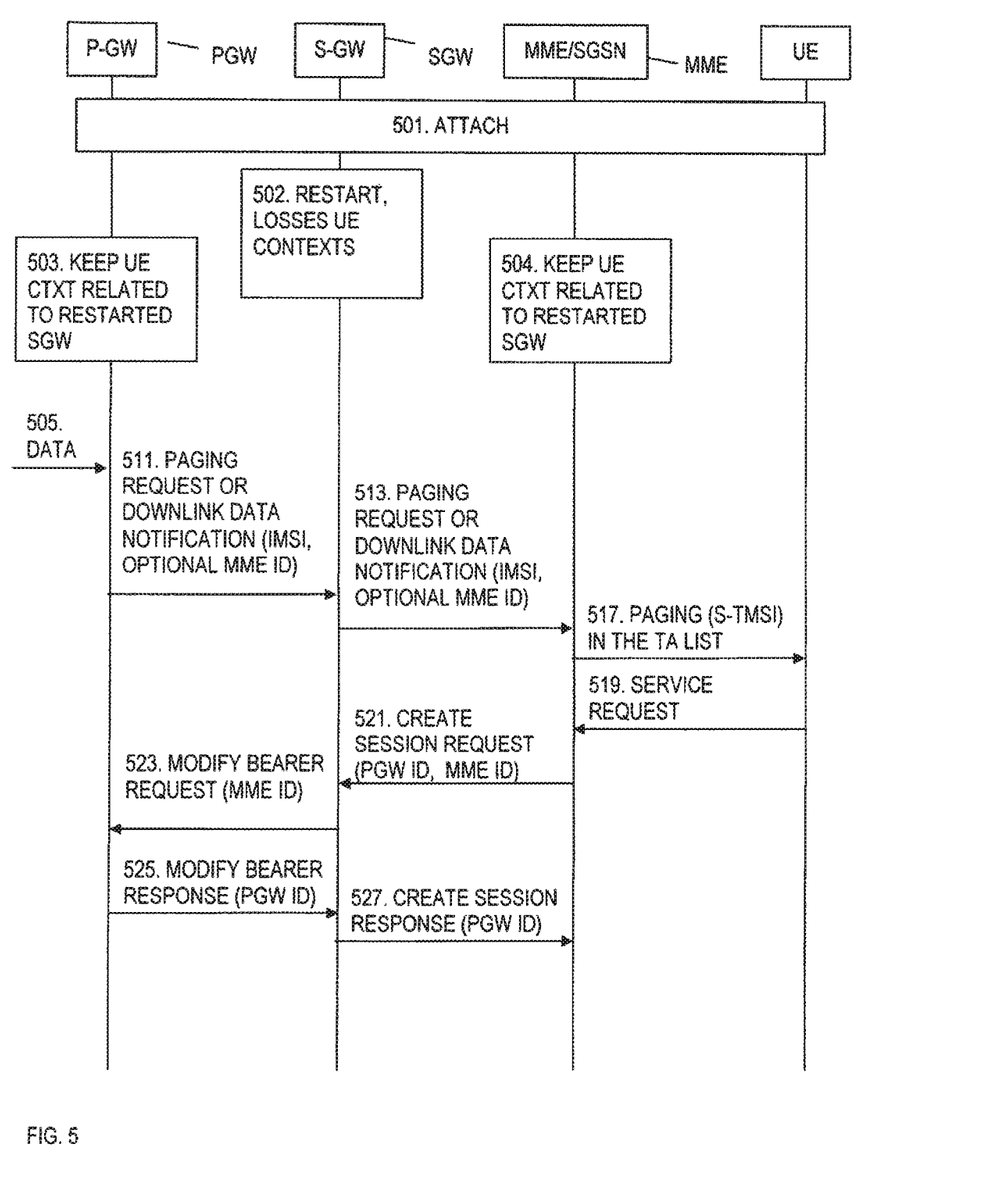
FIG. 5 shows a signalling diagram for a restarted serving gateway according to the invention.

According to an embodiment of the invention, MT call enhancements for a SAE/EPC network are provided. Embodiments of the invention may comprise the following functionality, with reference to FIG. 5:

(1) In case of receiving a DL (Downlink) packet 505, c.f. FIG. 5, for a UE related to the restarted SOW before recovery of the UE bearer and MM contexts—i.e. the PDN connection has not been relocated to a new SGW—the PGW sends a new GTP message 511 for example Paging Request or reuse the existing GTPv2 message Downlink Data Notification message towards a selected SGW, which could be the restarted SGW 502 or an arbitrary SGW, if the bearer context (for which a downlink packet is received) has been preconfigured (to perform PGW initiated paging request) as further explained in this invention based on the operators policies, which is either based on internal configuration in the PGW—such as based on QCI (QoS (Quality of Service) Class Identifier), ARP (Allocation and Retention Policy) or APN (Access Point Name) etc.—or based on the interaction with PCRF (Policy and Charging Rules Function).

Figure 6:
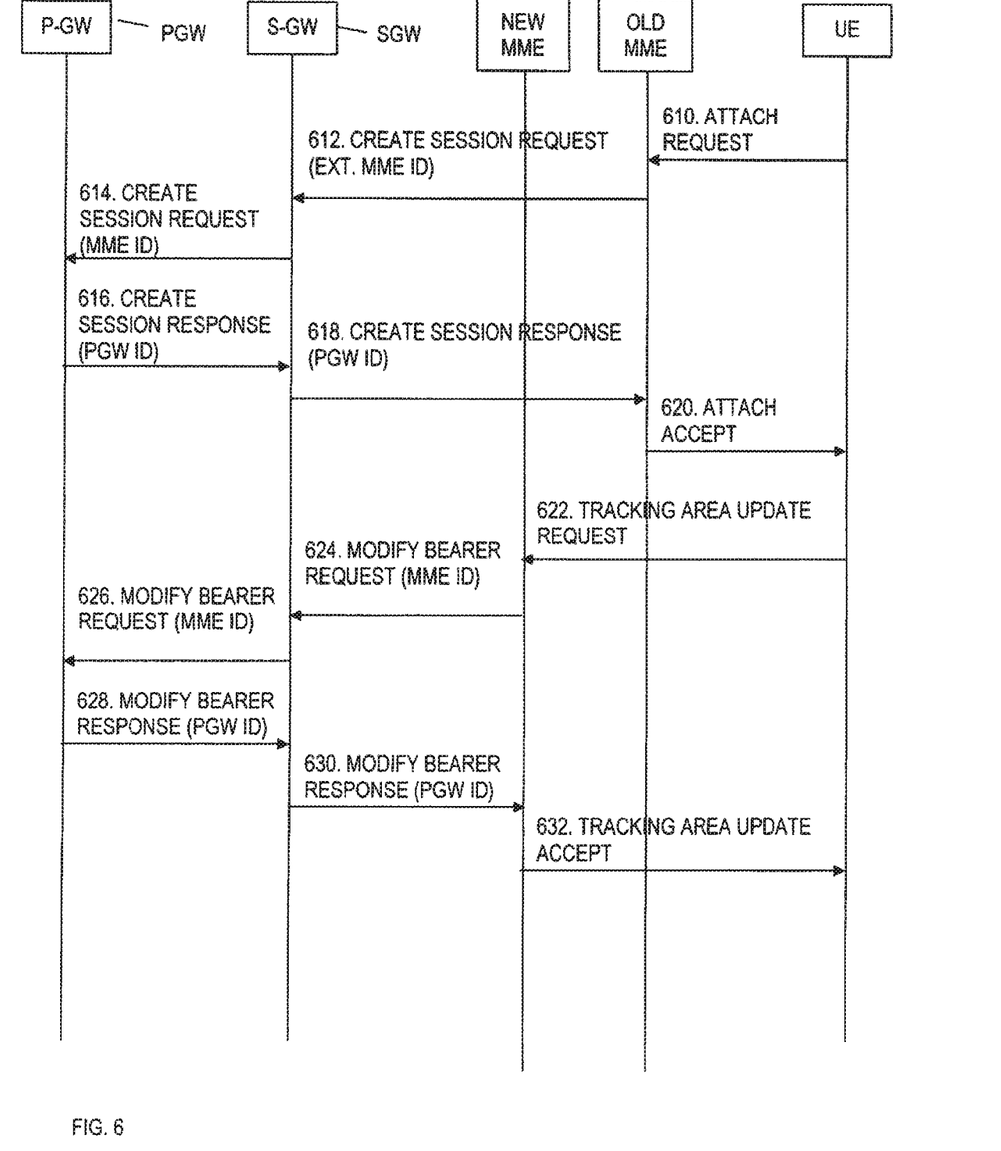
FIG. 6 shows the PGW being updated with a mobility management entity identity, MME ID, during Attach and Inter MME/SGSN mobility procedures, according to the invention.

Note that the PGW needs to know the MME/SGSN ID (IP address on the control plane), therefore, during PDN connection establishment and inter MME/SGSN mobility procedure, c.f. FIG. 6, the MME/SGSN ID should also be passed to the PGW.

One problem is that the PGW may not be able to receive an updated MME/SGSN ID during inter MME/SGSN intra SOW mobility procedures due to S5/S8 signalling may not always be available.

The following options may be used to solve this problem of receiving an MME/SGSN ID:

a). If Partial Failure feature is supported by MME/SGSN/SGW/PGW, the SGW will use an Update PDN connection set request to update the MME/SGSN ID, such as using the existing IE "MME-FQ-CSID" which contains MME/SGSN ID(MME/SGSN IP address).

b). The SGW triggers S5/S8 signalling by using a Modify Bearer Request to update MME/SGSN ID. However, this will create a lot of extra S5/S8 signalling.

c). If the SGW receives paging from the PGW, it forwards a paging request to all connected MME/SGSN's. If an MME/SGSN can not find the UE context corresponding to the IMSI included in the paging request, it simply regards the UE as not being handled by it and rejects the paging request. Consequently, the MME or the SGSN which is handling that UE will perform paging. In this case, a new GTP message is therefore provided according to an embodiment of the invention to avoid MME/SGSN confuse with the solution to MME/SGSN failure (See TR23.857).

Option c) implies some S11/S4 signalling during the paging, but considering the solution is a supplement to the existing SGW failure solution where MME/SGSN will perform SGW relocation at the same time, the amount of paging requests should be largely reduced. Note: comparing option b and c, is in fact a trade-off between increasing signalling over S5/S8 during normal operation and increase signalling during SGW failure and when PGW has received downlink data.

(2) The selected SGW relays 513 the received paging request 511, c.f. FIG. 5, from the PGW via an existing GTPv2 Downlink Data Notification message or a new message towards an MME/SGSN or the MME/SGSN indicated in the message by MME/SGSN ID.

(3) MME/SGSN initiates S-TMSI or P-TMSI paging 517 towards the concerned UE identified by IMSI as part of Network Initiated Service Request procedure.

(4) The MME/SGSN which performed paging using S-TMSI or P-TMSI will receive Service Request from UE/empty LLC frame, then the corresponding PDN connection will be relocated in an SGW, and then updated in PGW.

(5) The PGW will forward the downlink packet (not shown) to the UE over a new user plane which is established during SGW relocation.

Figure 2:
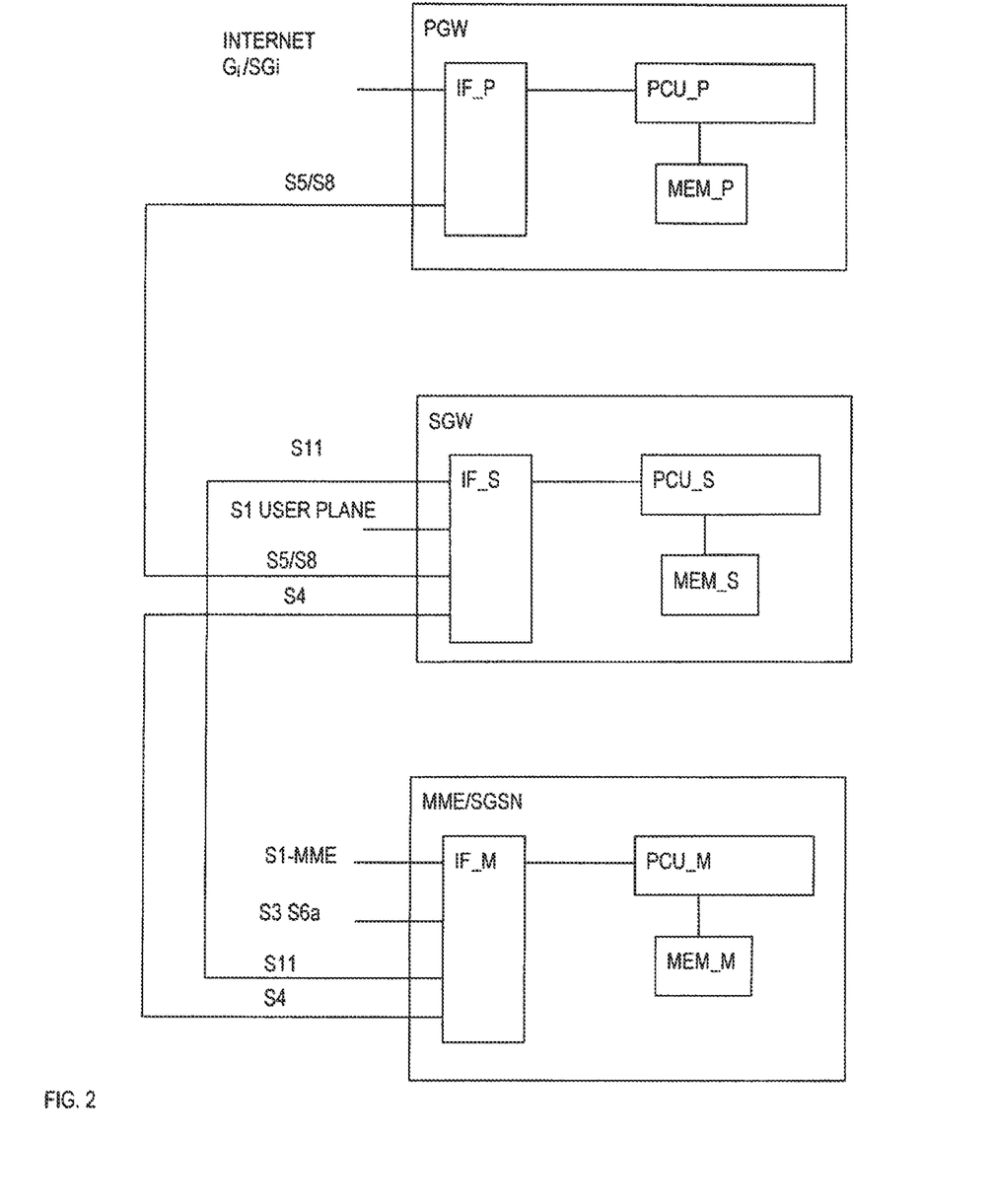
FIG. 2 shows embodiments of a packet gateway, a serving gateway and a mobility management entity according to the invention.

FIG. 2 shows an embodiment of a POW, a SGW and a MME/SGSN according to the invention.

The PGW comprises a central processing unit, PCU_P, a memory MEM_P and an interface unit IF_P comprising at least interfaces to the Internet $G_i$/SGi and a S5/S8 interface. The PGW may, in addition to the functionality explained in this document, comprise P-GW functionality as is known in the art.

There is moreover provided a SGW according to the invention comprising a central processing unit, PCU_S, a memory MEM_S and an interface unit IF_S comprising at least an S11 interface, a S1 user plane interface and a S5/S8 interface, as well as a S4 interface. The SGW may, in addition to the functionality explained in this document, comprise SGW functionality as is known in the art.

Figure 3:
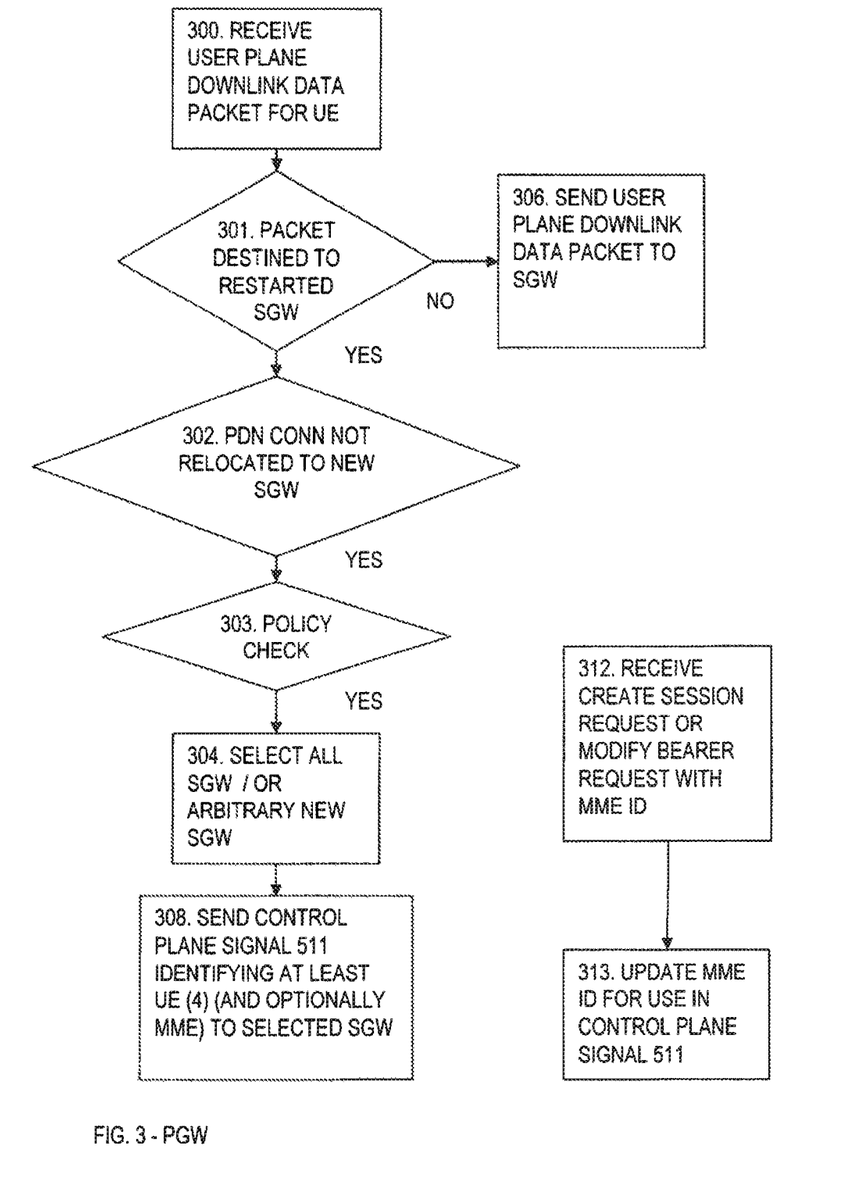
FIG. 3 shows an embodiment of a method for a packet gateway according to the invention.

There is moreover provided a MME according to the invention comprising a central processing unit, PCU_M, a memory MEM_M and an interface unit IF_M comprising at least an S1-CP interface, a S3 user plane interface and a S6a and S11 interface, as well as a S4 interface. The MME may also comprise MME functionality as is known in the art, in addition to the functionality explained in this document The functionality of the PGW according to embodiments of the invention shall now be dealt with referring to FIG. 3 showing an embodiment of a method that may be implemented and carried out in the processor unit PCU_P in the PGW and conveniently be stored as software instructions in the memory MEM_P, shown in FIG. 2.

In step 300, a user plane downlink data packet 505 destined for a user entity, UE is received.

The PGW determines whether the user plane packet is destined to a restarted SGW, step 301.

If not, the PGW simply forwards 306 the user plane packet to the SGW, as is the case in FIG. 1, step 106.

If yes, in step 301, it is—determined 302 if the PDN connection of the restarted SGW has not yet been relocated to a new SGW.

Optionally 303 it is determined whether policies allow PGW initiated control plane signalling, that is, whether—a bearer context, for which the user plane data packet has been received, is preconfigured for allowing PGW initiated control plane signalling, based on operator policies, that is, allowing—transmitting (308) a control plane signal (511) to the selected SGW, the control plane signal (511) identifying at least the UE.

If yes to the condition(s) in step 302/303, the PGW selects an arbitrary SGW, step 304. The selected arbitrary SGW may be the restarted SGW. Alternatively, all connected SGW's may be selected.

In step 308, the PGW transmits a control plane signal 511 with an identification of least the UE, or UE context, and optionally an identification of the MME to the SGW selected in step 304.

In FIG. 3, there is moreover shown how the PGW receiving a create session request 614 or a modify bearer request 626 with a mobility management entity identity, MME ID, the PGW retrieves and updates 313 this identity for subsequent use in the control plane signal 511. Likewise, upon receiving a Modify Bearer request with a MME ID, 312, the PGW stores the received identity. Further reference is made to FIG. 6. The PGW may moreover insert its PGW identity, PGW ID, in Create session response 616 and modify bearer response 628 messages.

Figure 4:
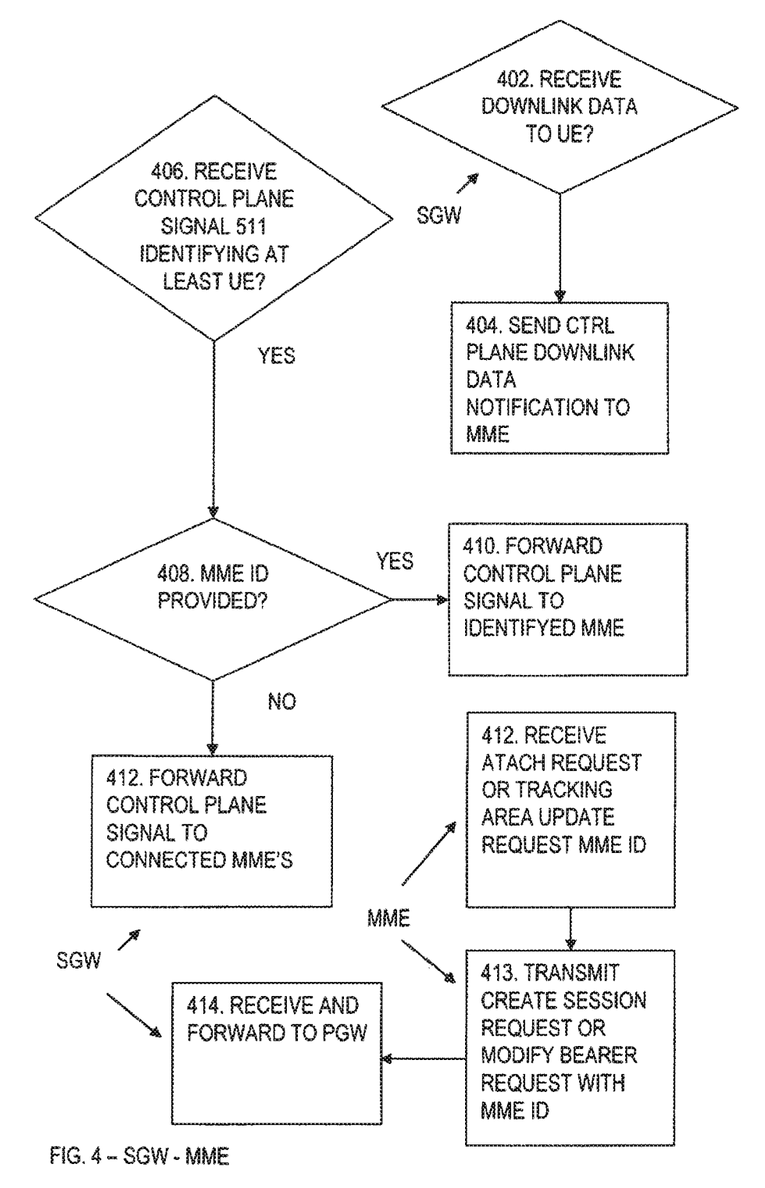
FIG. 4 shows an embodiment of a method for a serving gateway according to the invention and an embodiment of a method for a mobility management entity according to the invention.

In FIG. 4, the functionality of the SGW is demonstrated. FIG. 4 relates to a method that may be implemented and carried out in the processor unit PCU_S in the SGW and conveniently be stored as software instructions in the memory MEM_S, shown in FIG. 2.

The method for the SGW involves two parallel routines being carried out.

In the first routine, step 406, it is determined whether a control plane signal 511 is received identifying at least the user entity.

If so, it is further investigated whether a MME ID is. provided, 408.

If a MME ID is provided, the SGW forwards the control plane signal 513 to the identified MME, 410. On the other hand, if it is not the case, the SGW forward the control plane signal 513 to all connected MME's, 412.

The second routine incorporates the step of receiving downlink data to the user entity, 402. If so, a control plane Downlink Data Notification message is transmitted to the MME in the same manner as shown in FIG. 1, step 108.

In FIG. 4, there is furthermore shown a MME according to the invention. The MME is inserting 413 its MME ID in a Create Session Request signal 612 upon receiving 412 an Attach Request 610. Moreover, it is inserting 413 its MME ID in a Modify Bearer Request signal 624 upon receiving 412 a Tracking Area Update Request Signal 622. Further reference is made to FIG. 6. The SGW receives and forwards 414, the create session request and the modify bearer request to the PGW.

An embodiment of the detailed MT call enhancement scenario in case of a SGW restart is illustrated in FIG. 5:

(1) Step 501: The UE attaches and registers in the SAE/EPC network.

(2) Steps 502, 503, 504: The SGW restarts and loses its UE contexts, for instance after a short duration failure. MME, step 504, and PGW, step 503, keep the UE contexts related to the restarted SGW and smoothly re-establish the PDN/MM contexts of those UEs by selecting a new SGW, refer to 6.3.1.1 of TR 23.857. Another possibility is that of no immediate re-establishment, instead only MO (Mobile Originating) and MT (Mobile Terminated) calls trigger a re-establishment.

(3) In case the PGW receives a downlink, DL, packet 505 towards a UE related to the restarted SGW before the relevant PDN/MM contexts are re-established on a new SGW, step 302, the PGW selects step 304 a SGW and transmits step 308 a new GTP message 511 such as Paging request or reuse the existing message Downlink Data Notification message with new information elements according to an embodiment of the invention, namely the IMSI and optional MME ID extensions, to the selected S-GW.

(4) The selected SGW transparently relays 513 the received paging request message 511 to the MME indicated in the message 410 or all the MME/SGSN it is connected to 412.

(5) When the MME receives the paging request 513 for the UE related to the restarted SGW, the MME shall trigger a paging request 517 using S-TMSI or P-TMSI in the appropriate paging area.

(6) The UE performs the service request procedure 519 or send a LLC frame if the UE is camping in GERAN (GSM EDGE Radio Access Network).

(7) Steps 521 (Create session request (PGW ID, MME ID) from MME to SGW), 523 (Modify bearer request MME ID) to PGW, 525 (Modify bearer response (PGW ID) to SGW) and 527 (Create session response (PGW ID)): The MME relocates the UE to an available SGW and the MME indicates the currently used PGW to the selected SGW. The PGW will thus be able to forward downlink packets over the new user plane.

Populate MME/SGSN ID to PGW

A mentioned above, in some embodiments, the PGW needs to know the MIME ID (IP address on control plane) for transmitting the Downlink Data Notification signal with the MME ID, in order for this signal to be forwarded to an identified MME (c.f. steps, 312, 313) for being used the control plane signal 511, FIG. 5.

Hence, prior to the FIG. 5 signalling, the exemplary signalling embodiment shown in FIG. 6 may be completed.

In FIG. 6 an exemplary embodiment for establishing the relevant MME identification for the PGW and establishing the relevant PGW identification for a new MME is shown.

More particularly, FIG. 6 shows a MME initiated updating of PGW during Attach and Inter-MME TAU (Tracking Area Update) (option b), according to the invention.

According to aspects of the invention, as shown in FIG. 6, the MME/SGSN ID is one parameter to be included in the Paging Request from POW, to allow the SGW to forward the paging request to the correct MME/SGSN where the UE is being served.

MME/SGSN may update the PGW with its network ID during Attach and Inter-MME/SGSN mobility procedures. FIG. 6 is an example of such updating.

A new information element containing MME/SGSN ID may, according to the invention, therefore be included in the Create Session Request 612/614 during attach and RAU/TAU/handover with SGW relocation procedure and it may also be included in Modify Bearer Request 624/626 during inter MME/SGSN mobility procedure. For the inter MME/SGSN intra SGW mobility procedure, when there is no S5/S8 signalling available, to be able to update PGW MME/SGSN ID, one of options a), b) or c) above may be used.

Note that MME should also know the PGW ID in order to indicate to the SGW to select the currently used PGW during MT call recovery.

Among the advantages which may be accomplished according to embodiments of the invention are: the duration of MT call service unavailability in case of a SGW restart is reduced; MT call successful rates in failure cases are increased; the robustness of the SAE/EPC system is improved.

To summarize, the following methods, entities and signals are provided according to embodiments of the invention:

A method for a packet gateway node, PGW (P-GW), being adapted for communicating with at least a serving gateway node, SGW (S-GW), the PGW being adapted for receiving and forwarding downlink data packets to a user entity, UE, the SGW moreover being adapted for communicating with a mobility management entity, MME (MME/SGSN); comprising the steps of—when receiving a downlink user plane data packet 505 destined for the UE on a Packet Data Network, PDN, connection associated with a restarted SGW;—determining 302 if the PDN connection has not yet been relocated to a new SGW and if so—selecting 304 at least one SGW, that is, the restarted SGW or another SGW;—transmitting 308 a control plane signal 511 to the selected SGW, the control plane signal 511 identifying at least the UE.

In further embodiments of the invention, the control plane signal is an indication of receiving downlink data for said UE. It may be a paging request or a downlink data notification 511 or some other GTPv2 message. The control plane signal 511 may comprise an identity (MST) associated with the UE.

Moreover, the control plane signal 511 may comprise the identity of a mobility management entity, MME (MME/SGSN), through which the PGW communicated with the UE before the SGW was restarted.

The PGW may moreover carry out the step of—receiving a create session request 614 or modify bearer request 626 with the identity of a mobility management entity, MME (MME/SGSN), updating the identity of a mobility management entity, MME (MME/SGSN) for subsequently using the identity of a mobility management entity, MME (MME/SGSN) in the control plane signal 511.

The steps of—selecting 304 at least one SOW, that is, the restarted SGW or another SGW, and—transmitting 308 a control plane signal 511 to the selected SGW, the control plane signal 511 identifying at least the UE, may be further being dependent on that—a bearer context, for which the user plane data packet has been received, is preconfigured for allowing PGW initiated control plane signalling, based on operator policies, that is, allowing—transmitting 308 the control plane signal 511 to the selected SGW, the control plane signal 511 identifying at least the UE.

As is understood from FIG. 5, before the step of—receiving a user plane data packet 505 destined for the UE on a PDN connection associated 300 with a restarted SGW:—the UE is attaching 501 to the network comprising the PGW. As is also illustrated in FIG. 5 situation, the PGW keeps UE contexts, that is, PDN Connection/Bearer contexts, relating to the restarted SGW, whereas the restarted SGW has lost its UE contexts.

If the downlink user plane data packet is not to be forwarded via a restarted SGW 301,—the PGW transmitting 306 the user plane data packet to the SGW.

Regarding the method for a serving gateway node, SGW: The SGW is being adapted for communicating with at least a packet gateway node, PGW, the SGW and being adapted for receiving and forwarding downlink data packets to a user entity, UE, the SGW communicating moreover communicating with a mobility management entity, MME. The method comprises the steps of—if receiving 406 a control plane signal 511 from the PGW identifying at least the UE,—forwarding 410, 412 the control plane signal to a plurality of MME's the SGW is connected to or to a MME indicated in the control plane signal 511.

This may be performed by the SGW carrying out the steps of—resolving 408 whether an identity of a MME is provided,—if an identity of a MME is provided, forwarding 410 the control plane signal 513 to the identified MME, and—if not an identity of a MME is provided, forwarding 412 the control plane signal 513 to a plurality of connected MME's.

The SGW when receiving 402 a user plane downlink data packet 105 to the UE—is transmitting 404 a control plane downlink data notification 108 to the MME.

The control plane signal may be an indication of receiving downlink data for said UE.

As mentioned in connection with the PGW the control plane signal may be a paging request or a downlink data notification 511 or another type of GTPv2 signal.

The method for the SGW may moreover comprise the steps of—receiving and forwarding 414 a create session request 614 or modify bearer request 626 with the identity of a mobility management entity, MME (MME/SGSN), to the PGW.

Moreover, the control plane signal 511, 513 may be forwarded 513 by the SGW.

The PGW (P-GW) may be a Packet Data Network Gateway as is known in 3GPP standards among others referred to in the background. The MME may be a Mobility Management Entity/Serving gateway Support Node (MME/SGSN) and associated identities are MME/SGSN identities.

There is also provided a method for a Mobility Management Entity, MME, wherein the MME is being adapted for inserting its MME identity (MME ID) in a Create Session Request signal 612 or in Modify Bearer Request Signal 624.

Moreover, a signal is provided for a 3GPP a serving gateway node, S-GW or a PDN gateway node, P-GW, or a Mobility Management Entity, MME, the S-GW being adapted for communicating with at least a PDN gateway node, P-OW, and a user entity, UE, the signal being formatted as a Create Session Request 612, 614 for use during attach and RAU/TAU/handover with SOW relocation procedure, or Modify Bearer Request 624, 626 during inter MME/Serving Gateway Support Node mobility procedure, the signal comprising an information element containing a Mobile Mobility Entity Identity, MME ID/Serving Gateway Support Node identity, MME/SGSN ID.

There is also provided a Signal for a 3GPP a serving gateway node, S-GW, or a PDN gateway node, P-GW, or a Mobility Management Entity, MME, the P-GW and S-GW being adapted for communicating with one another, the S-GW being further adapted for communicating with a user entity, UE, via a mobility management entity, MME, the signal being formatted as a GTP message 511, 513 such as Paging request or Downlink Data Notification message with information elements corresponding to an International Mobile Subscriber Identity, IMSI, and/or a Mobile Mobility Entity Identity, MME ID.

Furthermore there is provided according to embodiments of the invention:

A packet gateway node, POW (P-GW), being adapted for communicating with at least a serving gateway node, SGW (S-GW), the PGW being adapted for receiving and forwarding downlink data packets to a user entity, UE, the SGW moreover being adapted for communicating with a mobility management entity, MME; the PGW being adapted for when receiving a downlink user plane data packet 505 destined for the UE on a Packet Data Network, PDN, connection associated with a restarted SGW;—determining 302 if the PDN connection has not yet been relocated to a new SOW and if so—selecting 304 at least one SGW, that is, the restarted SGW or another SGW;—transmitting 308 a control plane signal 511 to the selected SGW, the control plane signal 511 identifying at least the UE.

PGW ma be adapted for—receiving a create session request 614 or modify bearer request 626 with the identity of a mobility management entity, MME (MME/SGSN), updating the identity of a mobility management entity, MME (MME/SGSN) for subsequently using the identity of a mobility management entity, MME (MME/SGSN) in the control plane signal 511.

For instance, the PGW is being a 3GPP Packet Data Network Gateway (P-GW).

A serving gateway node, SGW, is also provided, the SGW being adapted for communicating with at least a packet gateway node, PGW, the SGW and being adapted for receiving and forwarding downlink data packets to a user entity, UE, the SGW communicating moreover communicating with a mobility management entity, MME; the SGW further being adapted for—if receiving 406 a control plane signal 511 from the PGW identifying at least the UE,—forwarding 410, 412 the control plane signal to a plurality of MME's the SGW is connected to or to a MME indicated in the control plane signal 511.

Serving gateway node, SGW, may also be adapted for—receiving and forwarding 414 a create session request 614 or modify bearer request 626 with the identity of a mobility management entity, MME (MME/SGSN), to the PGW.

As mentioned above the serving gateway node, SGW, may be a 3GPP Serving Gateway (S-GW).

Finally, there is provided a Mobility Management Entity, MME, according to an embodiment of the invention, the MME being adapted for inserting its MME identity (MME ID) in a Create Session Request signal 612 or in Modify Bearer Request Signal 624.

The Mobility Management Entity, MME, could be a 3GPP MME/S4-SGSN MME.

ABBREVIATIONS eNB—E-UTRAN Node B
EPC—Evolved Packet Core
GTP—GPRS Tunnel Protocol
MM—Mobility Management
MME—Mobility Management Entity
MT—Mobile Terminating Call
PDN—Packet Data Network
P GW—PDN Gateway
SAE—System Architecture Evolution
S GW—Serving Gateway
TAI—Tracking Area Identity
TAU—Tracking Area Update

The invention claimed is:

1. A method in a communications network, the method comprising:
    a packet gateway node (PGW) receiving a downlink user plane data packet destined for a user entity (UE) on a Packet Data Network (PDN) connection associated with a restarted serving gateway (SGW);
    the PGW, as a consequence of receiving the downlink user plane data packet, determining whether the PDN connection has been relocated to a new SGW; and
    as a consequence of determining that the PDN connection has not been relocated to a new SGW, the PGW i) selecting a SGW from a set of SGWs and ii) transmitting to the selected SGW a control plane signal comprising a UE identifier for identifying the UE and a mobile management node identifier for identifying a mobility management node, wherein
    the steps of selecting at least one SGW and transmitting to the selected SGW a control plane signal identifying at least the UE are further dependent on that a bearer context, for which the user plane data packet has been received, is preconfigured for allowing PGW initiated control plane signaling based on operator policies.

2. The method of claim 1, wherein the control plane signal is a paging request or a downlink data notification.

3. The method of claim 1, wherein the control plane signal is a GPRS Tunnelling Protocol version 2 (GTPv2) message.

4. The method of claim 1, wherein the UE identifier is an international mobile subscriber identity (IMSI) associated with the UE.

5. The method of claim 1, wherein the mobility management node identifier included in the control plane signal identifies a mobility management node through which the PGW communicated with the UE before the SGW was restarted.

6. The method of claim 1, wherein the PGW receives the user plane data packet destined for the UE after the UE attaches to a network comprising the PGW.

7. A method in a communications network, the method comprising:
a packet gateway node (PGW) receiving a downlink user plane data packet destined for a user entity (UE) on a Packet Data Network (PDN) connection associated with a restarted serving gateway (SGW);
the PGW, as a consequence of receiving the downlink user plane data packet, determining whether the PDN connection has been relocated to a new SGW;
the PGW, as a consequence of determining that the PDN connection has not been relocated to a new SGW, i) selecting a SGW from a set of SGWs and ii) transmitting to the selected SGW a control plane signal comprising a UE identifier for identifying the UE;
the selected SGW receiving the control plane signal transmitted by the PGW;
the selected SGW determining whether the control plane signal includes a UE identifier and whether the control plane signal includes a mobility management node (MMN) identifier for identifying an MMN;
the selected SGW, in response to determining that the control plane signal includes a UE identifier,
(i) forwarding the control plane signal to a plurality of mobile management nodes to which the SGW is connected in the case that the control plane signal does not include an MMN identifier, or
(ii) forwarding the control plane signal to the MMN identified in the control plane signal in the case that the control plane signal includes the MMN identifier.

8. The method of claim 7, wherein the control plane signal includes the MMN identifier.

9. The method of claim 7, further comprising the SGW receiving a user plane downlink data packet for the UE.

10. The method of claim 9, wherein the SGW, in response to receiving the user plane downlink data packet for the UE, transmits a control plane downlink data notification to an MMN.

11. The method of claim 7, wherein the control plane signal is an indication of receiving downlink data for said UE.

12. The method of claim 7, wherein the control plane signal is a paging request or a downlink data notification.

13. The method of claim 7, wherein any of the control plane signals is a GTPv2 signal.

14. The method of claim 7, further comprising:
the SGW receiving a create session request or modify bearer request with the identity of a mobility management node; and
the SGW forwarding to the PGW the create session request or modify bearer request.

15. The method of claim 7, wherein the MMN is a Mobility Management Entity (MME) or a Serving gateway Support Node (SGSN).

16. A communication system comprising:
a set of serving gateways (SGWs); and
a packet gateway apparatus (PGW-A) comprising: a memory and one or more processors coupled to the memory, wherein the one or more processors are configured to: (1) determine whether a Packet Data Network (PDN) connection associated with a restarted serving gateway (SGW) has been relocated to a new SGW as a consequence of the PGW-A receiving a user plane data packet destined for a user entity (UE) associated with the PDN connection and (2) as a consequence of determining that the PDN connection has not been relocated to a new SGW, (i) select a SGW from the set of SGWs and (ii) transmit to the selected SGW a control plane signal comprising a UE identifier for identifying the UE, wherein
the selected SGW is configured to:
determine whether a control plane signal transmitted by the PGW-A includes a UE identifier,
determine whether the control plane signal includes a mobility management node (MMN) identifier for identifying an MMN, and
in response to determining that the control plane signal includes a UE identifier,
(i) forward the control plane signal to a plurality of mobile management nodes to which the selected SGW is connected in the case that the control plane signal does not include an MMN identifier, and
(ii) forward the control plane signal to the MMN identified in the control plane signal in the case that the control plane signal includes the MMN identifier.

17. The communication system of claim 16, wherein the control plane signal is a paging request or a downlink data notification.

18. The communication system of claim 16, wherein the control plane signal is a GPRS Tunnelling Protocol version 2 (GTPv2) message.

19. The communication system of claim 16, wherein the UE identifier is an international mobile subscriber identity (IMSI) associated with the UE.

20. The communication system of claim 16, wherein the mobility management node identifier included in the control plane signal identifies a mobility management node through which the PGW-A communicated with the UE before the SGW was restarted.

21. The communication system of claim 16, wherein the control plane signal includes the MMN identifier.

22. The communication system of claim 16, wherein the SGW is further configured such that, in response to the SGW receiving a user plane downlink data packet for the UE, the SGW transmits a control plane downlink data notification to an MMN.

23. The communication system of claim 16, wherein the SGW is further configured such that, in response to the SOW receiving a create session request or modify bearer request with the identity of a mobility management node, the SGW forwards to the PGW-A the create session request or modify bearer request.

24. The communication system of claim 16, wherein the MMN is a Mobility Management Entity (MME) or a Serving gateway Support Node (SGSN).

* * * * *